Patented June 1, 1954

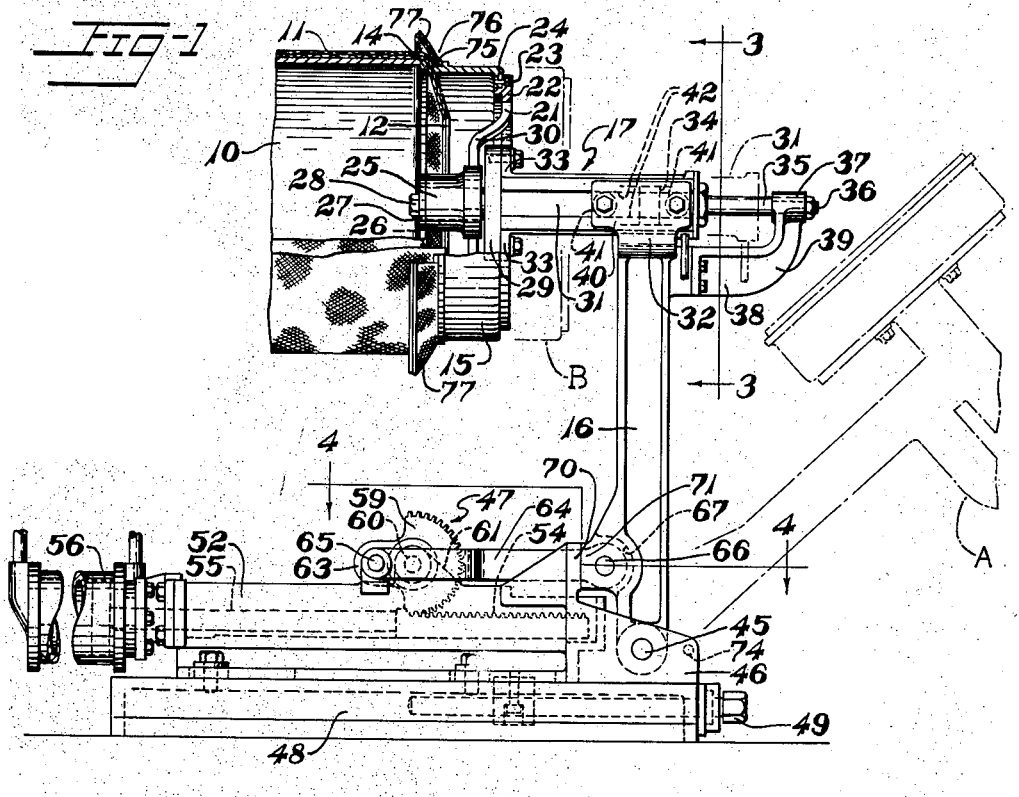

2,679,885

UNITED STATES PATENT OFFICE 2,679,885

TIRE BUILDING APPARATUS

John Peters Sapp, Kent, and Frank S. Sternad, Cuyahoga Falls, Ohio, assignors to The B. F. Goodrich Company, New York, N. Y., a corporation of New York Application May 26, 1951, Serial No. 228,384

7 Claims. (Cl. 154—9)

This invention relates to tire-building apparatus and more especially to apparatus for positioning bead cores in a tire casing during its construction.

In the manufacture of tire casings according to the "flat-band" method, the various plies of rubber-impregnated cord or fabric tire-building materials have usually been assembled on a collapsible, cylindrical building drum mounted on the unsupported end of a cantilever-like shaft which rotates the drum. One of the initial tire-building operations has been to place the under-bead plies on the drum with the marginal edges of these plies turned inwardly around each end of the drum toward the rotational axis of the drum. Then an annular bead core has been fitted over these edges and against the drum so that the bead core is exactly concentric about the rotational axis of the drum. To complete the construction of the casing these edges have been turned outwardly around the bead cores and after the additional plies, tread, etc. have been assembled, the drum has been collapsed and the casing has been removed by pulling the casing off the outboard or free end of the drum.

It has been proposed to support these bead cores on rings adjacent the ends of the drum and to locate the bead cores in the casing by moving these bead-placing rings into contact with the fabric at the ends of the drum at the desired time. But to permit the casing to be removed it is necessary to mount the bead-placing ring at the outboard end of the drum in such a manner that after the outboard bead core is located, the ring can be moved to a position sufficiently clear of the building drum to permit the casing to be pulled over the outboard end of the drum.

It is an object of the present invention to provide bead-setting apparatus which is movable toward and away from the outboard end of a building drum by a novel structure which is particularly rigid in its construction.

Another object is to provide bead-setting apparatus which is normally located in a position where the apparatus does not interfere with the work of a tire-builder or other plant activities in the vicinity of the tire-building equipment and where it does not interfere with the removal of a tire casing from the building drum and yet which may be brought into operative position adjacent the drum quickly at the desired time.

Another object is to provide bead-setting apparatus in which the bead-placing ring and its supporting structure are movable as a unit toward and away from the building drum, and, in which the bead placing ring is also movable linearly relative to the ring-supporting structure so that when the apparatus is in the operative position the ring may be moved linearly directly against the drum to locate the bead core accurately.

A further object is to provide bead-setting apparatus which is readily adaptable for use with building drums of different size without the necessity of adjusting or changing the movement of the bead-setting apparatus.

These and other objects will be apparent from the following description of the drawings in which:

Fig. 1 is a front elevation of apparatus constructed according to and embodying this invention;

Fig. 2 is a front elevation showing a portion of the apparatus of Fig. 1 with certain parts moved to a different position;

Fig. 3 is a sectional view taken on the line 3—3 of Fig. 1; and

Fig. 4 is a plan view taken on the line 4—4 of Fig. 1.

In Fig. 1, a collapsible building drum 10 of known construction is shown with its left or inboard end broken away and with several plies 11 of tire-building material assembled on the cylindrical surface of the drum. The marginal edge 12 of these plies is turned inwardly around the outboard end 14 of the drum toward the rotational axis of the drum. The drum is supported at the end of a horizontal shaft (not shown) which extends axially into the drum from the inboard side and the drum is adapted to be rotated by this shaft. At the outboard end of the drum the bead-setting apparatus of this invention is shown in solid lines in its operative position adjacent the drum. The chain-dotted lines marked "A" indicate the position of the apparatus when it has been moved away from the drum.

The apparatus includes a bead-placing ring 15 which is mounted on the upper end of a column 16 and which is connected to the top of the column 16 by the carriage mechanism 17 which is operable to move the ring 15 linearly relative to the column 16. A portion of the bead-placing ring 15 is broken away in Fig. 1 to show more clearly the structural details of the ring. The ring 15 is generally cylindrical and is approximately equal in diameter to the diameter of the building drum. The ring is supported by a spoked spider 21 having a continuous peripheral flange 22 which is removably fastened by the screws 23 (Fig. 3) to a radially-inwardly directed flange 24 around the back of the ring. At the radial center of spider 21 there is a hub 25 which is rotatably mounted on a horizontal stub shaft or spindle 26. Hub 25 is connected to this spindle by a plate 27 which encloses the front end of the hub and which is fastened to the end of the spindle by the cap screw 28. The spindle 26 is formed integrally with and is perpendicular to a vertical plate 29, which fits against the back end of the hub 25 so that the hub 25 is prevented from moving axially on spindle 26 by the plates 27 and 29. The hub 25 contains suitable bearings (not shown) so that the ring 15 is freely rotatable on the spindle. The spokes of spider 21 are bent inwardly at 30 to offset hub 25 inwardly from the radial flange 24 so that plate 29 fits inside and is surrounded by ring 15, thereby making the ring structure advantageously compact.

The carriage mechanism 17 which connects the ring 15 to the column 16 is adapted to impart linear movement to ring 15 relative to the column so that the ring may be pushed directly against the end of the drum when the ring is axially aligned with the drum. The mechanism includes a fluid-operated, pressure cylinder 31 which is slideably supported by a bracket 32 fastened on the upper end of column 16. The cylinder 31 is formed with a pair of flanges 33—33 at its enclosed end and each of these flanges is bolted to the back side of plate 29 in a position such that the cylinder is axially aligned with the spindle 26. This cylinder is of the double-acting type and has a reciprocable piston 34 inside it connected to a piston rod 35 which projects outwardly from the end of the cylinder away from plate 29. The end 36 of piston rod 35 outside the cylinder is rigidly fastened in a boss 37 at the end of an arm 38 which extends laterally from bracket 32 and which is curved upwardly at 39 to receive the end of the piston rod.

The cylinder 31 fits between two upright plates 40—40 (Fig. 3) on the bracket 32 and is slideably supported between these plates on two pairs of rollers 41—41 each pair of which is mounted on the inside surface of the plates 33 opposite each other. The rollers 41—41 fit into two tracks 42—42 formed parallel to the axis of the cylinder along two opposite sides of the cylinder. When fluid is admitted into one end of cylinder 31, the pressure of the fluid against piston 34 moves the cylinder 31 axially relative to the rigidly-fastened piston rod 35 so that the tracks 42—42 moves across the tops of the rollers 41—41. In this manner the cylinder 31 is adapted to move the bead-placing ring 15 and the spindle 21 on which the ring is mounted relative to the column 16. When the column 16 is in its vertical position of Fig. 1 the ring 15 may be moved axially toward or away from the building drum 10 depending on the end of the cylinder into which the fluid pressure is admitted.

Ordinarily the linear distance through which the ring 15 is moved by the cylinder 31 is relatively short. The chain-dotted lines in Fig. 1 marked "B" indicate approximately the closest position that the ring 15 may be moved toward the column 16 with the apparatus shown.

In order to move the bead-placing ring 15 to a position where it is sufficiently clear of the end of the building drum to permit a tire casing to be pulled off the outboard end 14 of the drum, the lower end of column 16 is pivotally mounted on a horizontal pivot pin 45 between two upright plates 46—46 (Fig. 4) located at one end of a column-control mechanism 47. The mechanism 47 is preferably mounted on the base of the tire machine and is adapted to swing the column 16 back and forth about the pivot pin 45 in a vertical plane extending along the axis of the building drum. The mechanism 47 includes a base portion 48 which is adjustably connected by the screw 49 to the tire machine on which the bead-setting apparatus is installed. This adjusting screw 49 is used to align the bead-setting apparatus properly when the apparatus is being installed. Once the apparatus is installed no further changes, adjustments etc., need be made, even when building drums of different size are used.

The base 48 has a relatively long channel 50 defined between two spaced, parallel, vertical plates 52—52 located along the top of the base (see Fig. 4). The channel 50 extends parallel to the axis of the building drum, and, slideably mounted in this channel is a toothed rack 54 which is rigidly fastened to the end of a piston rod 55 of a fluid-operated pressure cylinder 56. Cylinder 56 is rigidly connected to base 48 at the end of the channel 50 away from column 16 and is operable to slide the rack back and forth in the channel.

The rack 54 is meshed with a segmental pinion 59 which is pivotally supported by a pin 60 extending laterally across the channel between a pair of upwardly projecting ears 61—61 formed on plates 52—52 (see Fig. 4). Extending outwardly from the toothed portion of the pinion 59 is a lug 63 which is pivotally connected to the forked end of a link 64 by a pin 65. The opposite or shank end of this link 64 is pivotally fastened by a pin 66 in a recess 67 formed in column 16 just above the pivot 45. As the rack 54 is moved along the channel by the operation of the cylinder 56, the pinion 59 is rotated around the pin 60 to transmit the motion of the rack to the link 64 thereby swinging the column about the pivot pin 45.

In the apparatus illustrated, the column 16 is adapted to be swung back and forth between an operative position at the vertical position shown in full lines in Fig. 1 and the angular position "A" shown in the broken lines in Fig. 1. It may be noted that when the column is in the operative position shown the pivots 60, 65 and 66 are aligned with each other in a dead-center position. Therefore, the column is locked by the linkage in its upright position by the kinematical arrangement of the linkage formed by the pinion 59, the lug 63 and the link 64, and cannot be swung toward the dotted position unless the cylinder 56 is operated to move the rack 54. Fig. 2 shows the relative positions of the rack 54, pinion 59 and link 64 when the column 16 has been moved to position about half way between its operative or vertical position and position "A."

At each extreme position of the column 16 suitable stops are provided to limit the movement of the column. The stop for the vertical position is a pair of lugs 70 projecting upwardly from the plates 52—52 at the end of the channel 50 near the column. These lugs 70 are adapted to abut a corresponding pair of lugs 71—71 at the recess 67 on the column 16 when the column is in its vertical position. When the column is in its angular position "A" it is adapted to contact a rod or bar 74 which is supported between the plates 46 to prevent the column from being swung beyond position "A."

Any suitable type of bead-placing ring may be used. The preferred ring 15 shown has an annular cavity around the hub 25 inside the ring in which a bead core may be stored until it is ready to be used. The ring 15 is also formed with a groove 75 around the edge of the drum as shown in Fig. 1 to receive a bead core 76. The bead core is ordinarily enclosed in a longitudinal fold of a flipper strip 77, the marginal edges of which are pasted together away from the bead core and then these edges are united with the plies of the tire to fasten the bead core in place after the bead core is positioned in the casing.

In operation of the apparatus the bead-placing ring 15 with a flippered bead core 76 positioned in groove 75 will be normally supported by the column 16 in the angular position "A" while the tire-builder assembles the under-bead plies 11 on the building drum. The tire-builder then operates suitable valve mechanism (not shown) which operates cylinder 56 to extend piston rod 55 so that the rack 54 is pushed toward the column 16. The rack 54 rotates the pinion 59 which pulls the link 64 so that column 16 is swung to its vertical position of Fig. 1.

At this point in the operation the spindle 26 will be coaxially aligned with the rotational axis of the drum but the cylinder 31 will be in the dotted position shown in Fig. 1 close to boss 37 so that ring 15 is in position "B" away from the drum. Fluid is then admitted to cylinder 31 so that the cylinder moves linearly away from the fixed end of its piston rod 35 towards the building drum to press the flippered bead core 76 on ring 15 against the end of the drum covered by the inwardly-turned edge 12 of the plies 11. The drum is ordinarily being rotated at relatively high speed when this operation occurs so that the ring 15 is rotated on its spindle 21 immediately upon contact with the drum. The tire-builder then forms or stitches the flaring edges of the flipper strip downwardly against the plies 11.

After the flipper strip is in place the cylinder 31 is operated to move through bracket 32 in the opposite direction to pull the ring 15 linearly away from the drum and back into position "B." Thereafter cylinder 56 is operated to retract piston rod 55 to move the rack 54 toward the cylinder 56 so that pinion 59 is rotated and the link 64 moves the column 16 to position A where the ring is sufficiently clear of the drum so that the casing may be removed. In position A the ring does not interfere with the other operations performed by the tire builder. Suitable control means may be provided to operate the cylinders 31 and 56 automatically in the proper sequence to perform the bead placing operation quickly.

With the present apparatus different size building drums may be used from time to time without affecting the operation of the bead-setting apparatus. If a drum of different diameter is used, a bead-placing ring of corresponding diameter may be readily fastened to the spider 21 by the bolts 23. If a longer or shorter drum is used the cylinder 31 is operable to move the bead-placing ring 15 linearly through the distance necessary to bring the ring into contact with the drum. No adjustments, changes, etc. of any sort are needed for the mechanism for effecting the translational movement of the column 16, etc. or for the carriage mechanism 17.

It is to be understood that while the outboard bead-placing ring is being employed to place beads at the outboard end of the drum, a corresponding bead-placing ring is employed at the inboard end of the drum to locate the inboard bead. However, this inboard bead-placing ring does not necessarily require the same manipulation as the outboard ring and therefore does not concern this invention.

Variations may be made in the apparatus without departing from the scope of the invention as it is defined in the following claims:

We claim:

1. Tire-building apparatus comprising a building drum supported for rotation about its axis, a bead-placing ring positionable at an end of said drum, a spindle for rotatably supporting said ring, said ring being mounted on said spindle for free rotation about its axis, a vertical column for supporting said spindle with its axis in the horizontal plane of the axis of said drum, power-operated means comprising a fluid-operated cylinder and a sliding carriage mounted on said column for moving said bead-placing ring and its spindle toward and away from said drum while maintaining alignment of the axes of said spindle and said drum, and means to effect a swinging movement of said spindle in a vertical plane through the rotational axis of the drum to further remove said ring from the vicinity of the end of said drum.

2. Tire-building apparatus comprising a building drum supported for rotation about its axis, a bead-placing ring positionable at an end of said drum, a spindle for rotatably supporting said ring, said ring being mounted on said spindle for free rotation about its axis, a vertical column for supporting said spindle with its axis in the horizontal plane of the axis of said drum, power-operated means comprising a fluid-operated cylinder and a sliding carriage mounted on said column for moving said bead-placing ring and its spindle toward and away from said drum while maintaining alignment of the axes of said spindle and said drum, and means for swinging said column away from said vertical position to further remove said ring from the vicinity of the end of said drum, said last-named means comprising a base to which the column is pivotally connected, a pinion pivotally mounted on said base, power-operated gear means to rotate said pinion, and means connected to the column and engaged with the pinion whereby movement of said pinion is transmitted to the column to swing the column about its pivotal connection.

3. Tire-building apparatus comprising a building drum adapted for rotation about a horizontal axis, a bead-placing ring positionable at one end of the drum, a column for supporting the ring in said position adjacent and coaxial of the end of the drum, a base to which the column is pivotally connected, a pinion rotatably mounted on the base, a rack meshed with the pinion, a pressure cylinder engaged with the rack and operable to move the rack to rotate the pinion, and a link pivotally connected to the pinion eccentrically of the axis of the pinion and to the column which link is adapted to transmit motion of the pinion to the column to swing the column about said pivotal connection on the base to move the ring into and out of said position.

4. Tire-building apparatus comprising a building drum adapted for rotation about a horizontal axis, a bead-placing ring positionable at one end of the drum, a column for supporting the ring in said position adjacent and coaxial of the end of the drum, means for moving the ring relative to the column and axially toward and away from the drum, a base to which the column is pivotally connected, a pinion rotatably mounted on the base, a rack meshed with the pinion, a pressure cylinder engaged with the rack and operable to move the rack to rotate the pinion, and a link pivotally connected to the pinion eccentrically of the axis of the pinion and to the column which link is adapted to transmit motion of the pinion to the column to swing the column about said pivotal connection on the column-support member to move the ring into and out of said position.

5. Bead-setting mechanism for a tire-building drum, the mechanism comprising a bead-placing ring, a substantially vertical column for supporting the ring adjacent one end of the drum with the axis of the ring aligned coaxially with the drum, a base to which the column is pivotally connected, means on the column connected to said ring for reciprocating the ring relative to the column in coaxial alignment with the drum to urge the ring against the end of the drum and to retract the ring from the drum, and means on the base engaged with the column for swinging the column arcuately relative to the base in a vertical plane when the ring is retracted from the drum to displace the ring from said position of alignment with the drum.

6. Bead-setting mechanism for a tire-building drum, the mechanism comprising a bead-placing ring, a column for supporting the ring in an operating position in which the axis of the ring is aligned coaxially with the drum, a base to which the column is pivotally connected, means on the column connected to said ring for reciprocating the ring relative to the column in coaxial alignment with the drum to urge the ring against the end of the drum and to retract the ring from the drum, and means on the base engaged with the column for swinging the column arcuately relative to the base when the ring is retracted from the drum to displace the ring from said operating position, the latter said means including a linkage having a dead-center position for locking the column against movement relative to the base when the ring is in said operating position.

7. Bead-setting mechanism for a tire-building drum, the mechanism comprising a bead-placing ring, a column for supporting the ring in an operating position in which the axis of the ring is aligned coaxially with the drum, a base to which the column is pivotally connected, a link pivotally connected to the column, a lug pivotally connected to the base and to said link, means for moving said lug pivotally relative to the base which movement through the cooperation of said link moves the column arcuately relative to the base to bring the ring into and out of said operating position, the respective pivotal connections between the lug and the base, the lug and the link, and the link and the column being aligned with each other in a dead-center position to lock the column against movement relative to the base when the ring is in said operating position.

References Cited in the file of this patent

UNITED STATES PATENTS

| Number | Name | Date |
| --- | --- | --- |
| 1,952,905 | Bostwick | Mar. 27, 1934 |
| 2,034,642 | Stevens | Mar. 17, 1936 |
| 2,393,504 | Stevens | Jan. 22, 1946 |